United States Patent [19]

Pietzner

[11] 4,052,137
[45] Oct. 4, 1977

[54] CORE MOLDING MACHINE

[75] Inventor: Jürgen R. Pietzner, Sheboygan Falls, Wis.

[73] Assignee: Kohler General, Inc., Sheboygan Falls, Wis.

[21] Appl. No.: 628,636

[22] Filed: Nov. 4, 1975

[51] Int. Cl.² ............................................. B29F 1/06
[52] U.S. Cl. .................... 425/577; 425/4 R; 425/355; 425/412; 425/817 R
[58] Field of Search ................ 425/4 R, 817 R, 420, 425/422, 423, 249, 351, 355, 407, 411, 414, 217, 242 B, 245 R, 78, 251, DIG. 224, 468, 577, 244

[56] References Cited

U.S. PATENT DOCUMENTS

| 2,420,709 | 5/1947 | Kopplin | 425/251 X |
|---|---|---|---|
| 2,556,951 | 6/1951 | Weidner | 425/422 |
| 2,627,765 | 2/1953 | Hopkins | 425/78 |
| 2,999,273 | 9/1961 | Gronemeyer | 425/249 |
| 3,167,811 | 2/1965 | Kraus et al. | 425/217 |
| 3,170,010 | 2/1965 | Schultz | 425/817 R |
| 3,314,105 | 4/1967 | Amsden | 425/249 |
| 3,513,507 | 5/1970 | Boulinghouse | 425/4 |
| 3,613,165 | 10/1971 | Corey | 425/451.6 |
| 3,664,784 | 5/1972 | Sibley | 425/351 |
| 3,912,430 | 10/1975 | Noel | 425/4 R |

FOREIGN PATENT DOCUMENTS 2,024,261  12/1971  Germany ...................... 425/817 R
1,008,672  11/1965  United Kingdom ................ 425/4 R Primary Examiner—Francis S. Husar
Assistant Examiner—W. R. Briggs
Attorney, Agent, or Firm—Joseph P. House, Jr.

[57] ABSTRACT

Each mold in a battery of molds consists of a female die which has a cylindrical mold cavity which is open on both ends. A coaxial end probe or plug is slidable into and out of one end of the cavity and has a duct therein through which plastic material is injected into the cavity. A coaxial center probe or plug is slidable into and out of the other end of the cavity and has a duct therein through which steam is injected into the cavity to heat the plastic therein. A coaxial crush probe or plug with a bore through which the center probe is slidable is itself slidable toward and away from the end of the cavity adjacent the center probe and closes that end of the cavity. A small vent gap is held open between the female die and the crush probe while the plastic beads are being injected into the cavity to allow air to escape from the cavity. The vent gap is closed after the cavity has been filled with plastic beads. After the steam has been applied to the center probe and the exterior of the female die to heat the plastic beads in the cavity, cool water is applied thereto to cool the molded article, which is substantially ejected from the cavity by the end probe.

19 Claims, 16 Drawing Figures

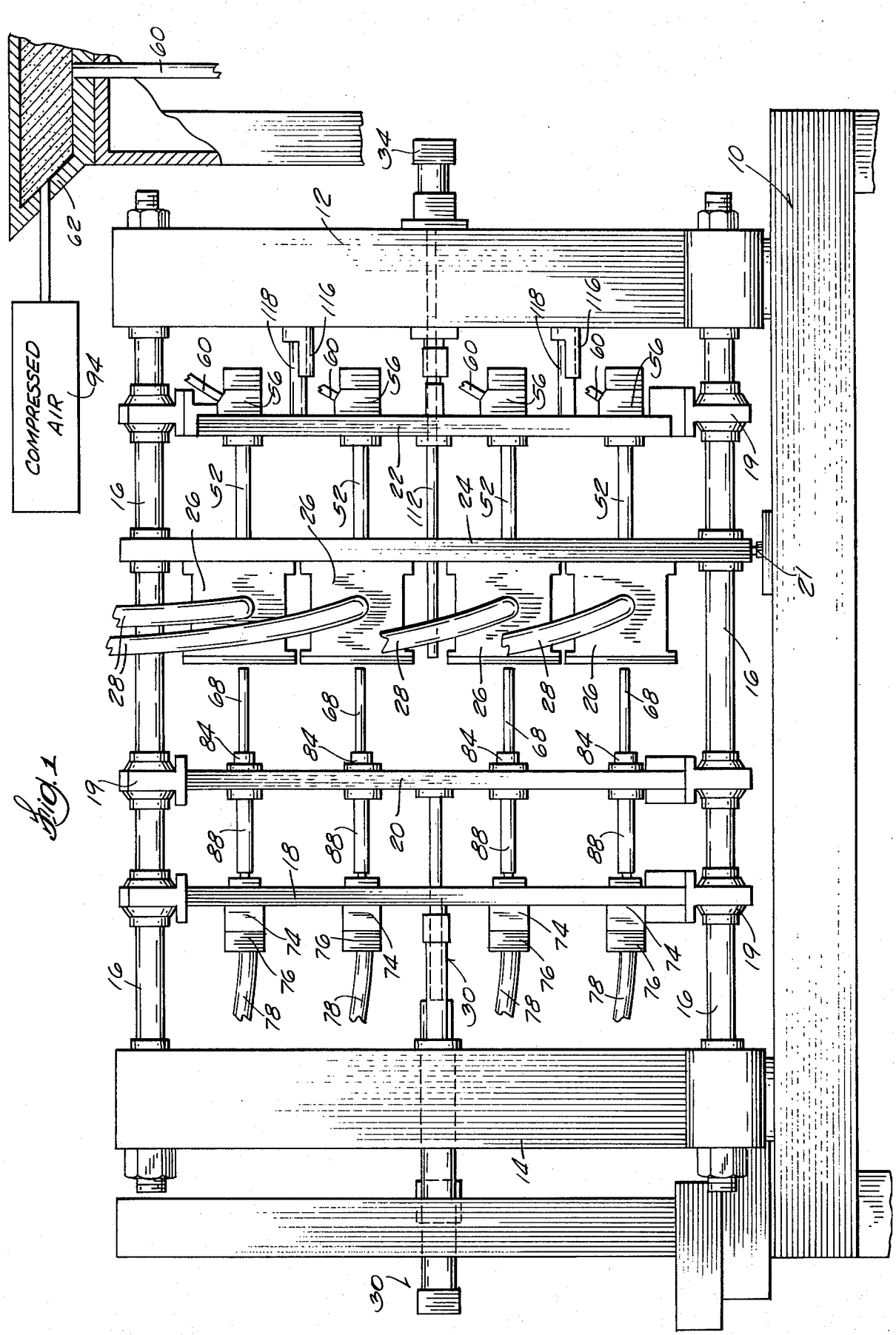

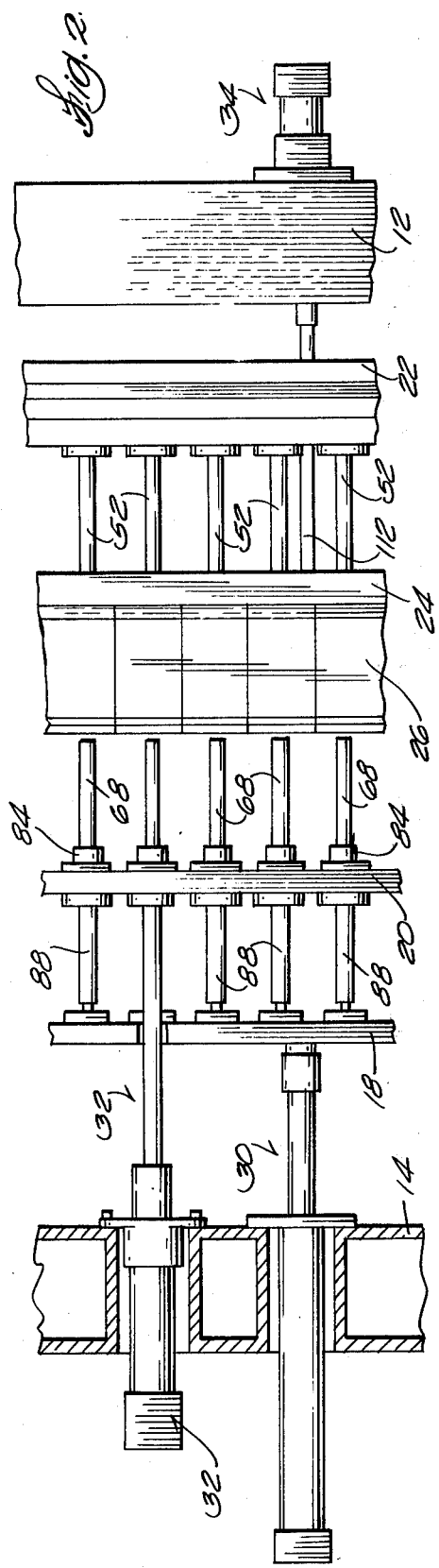
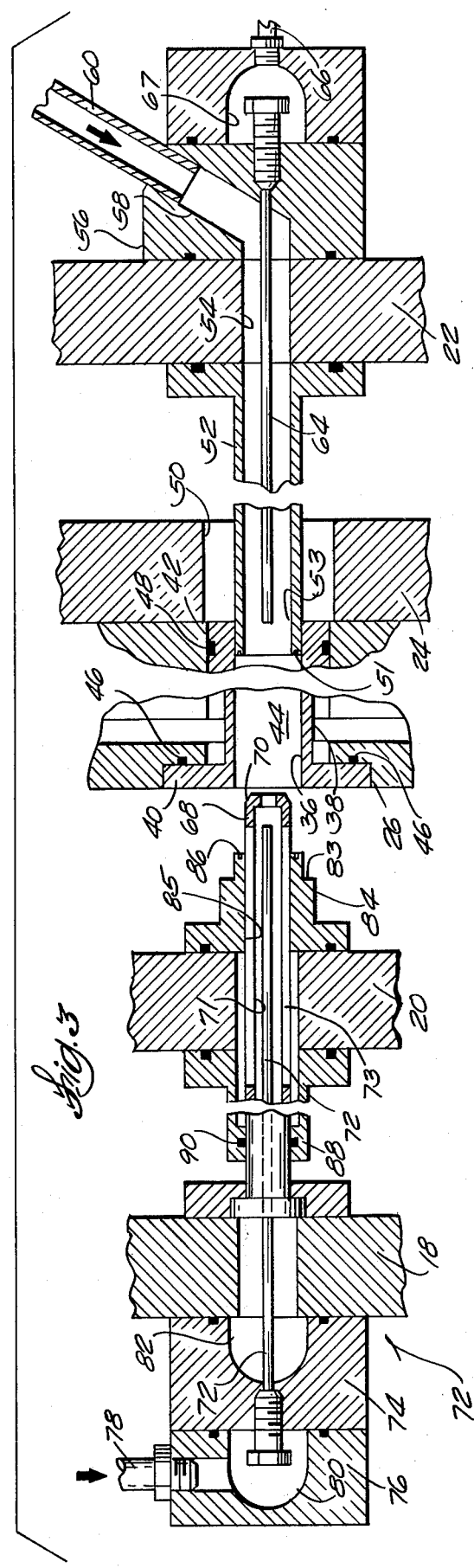

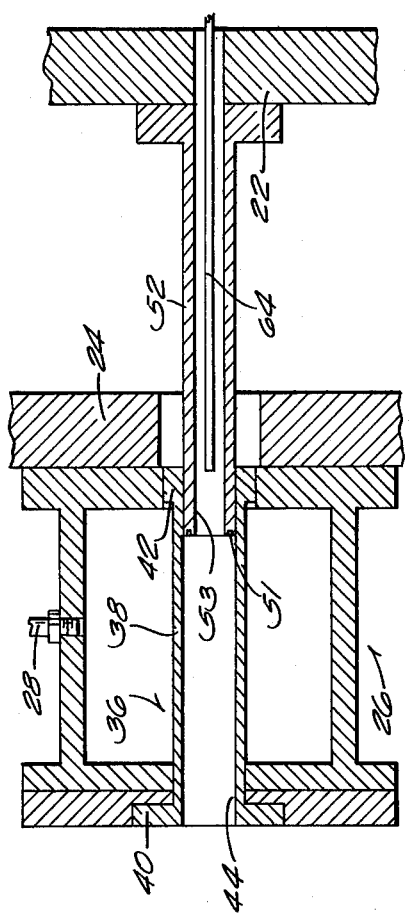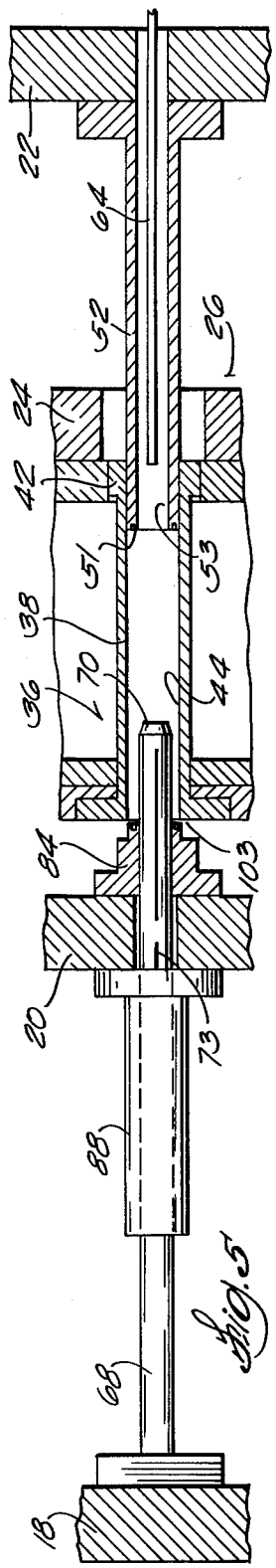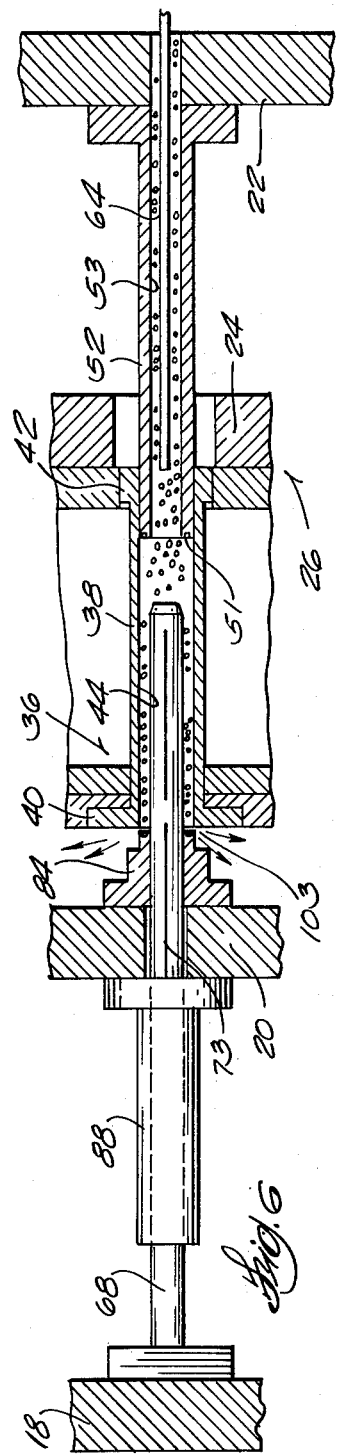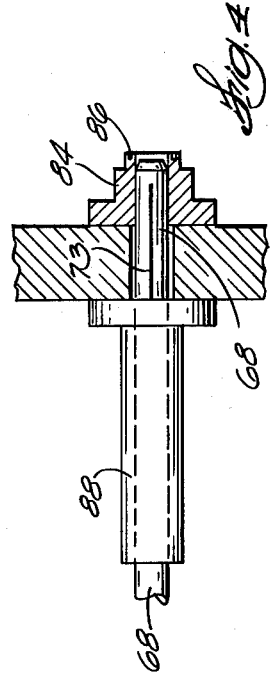

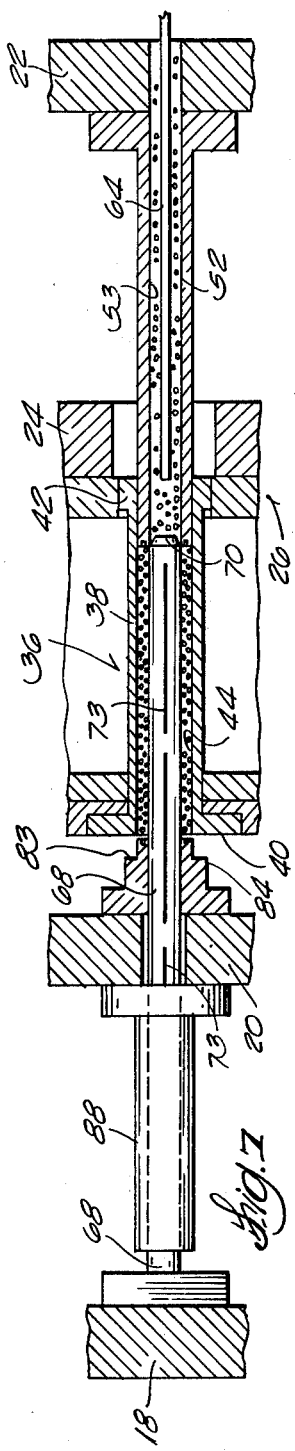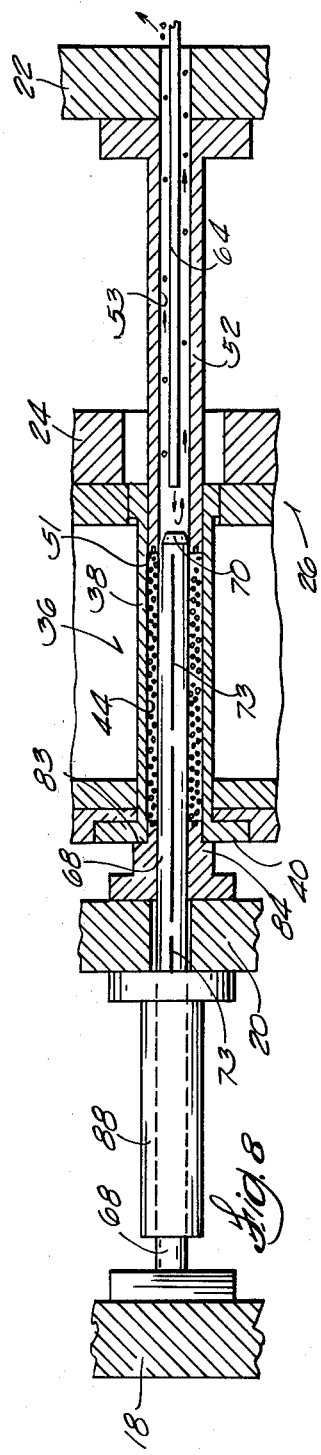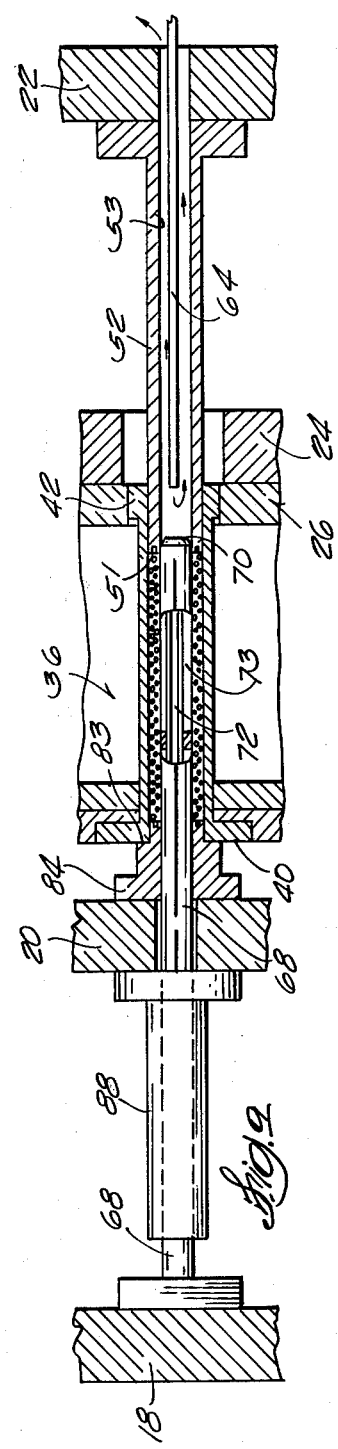

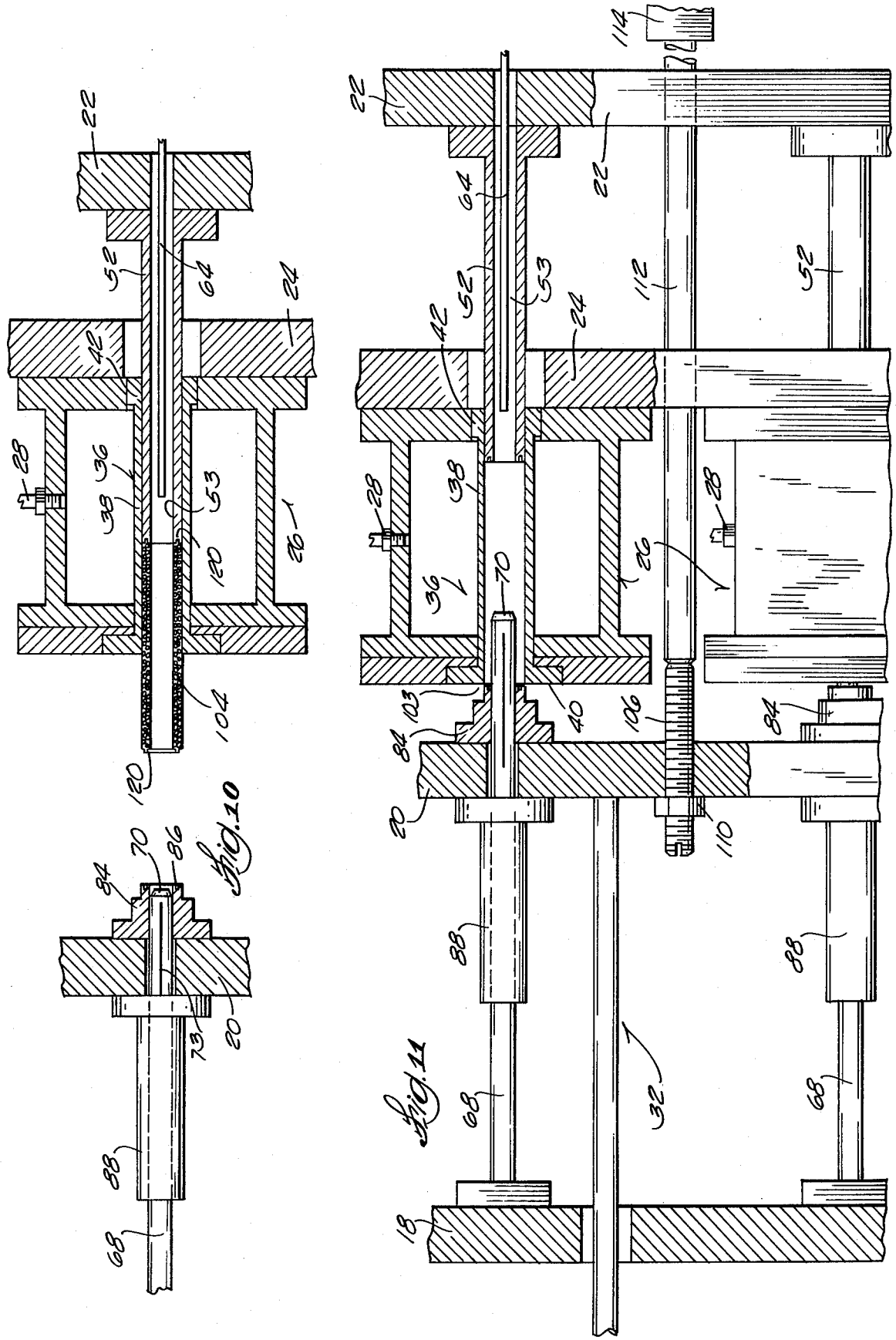

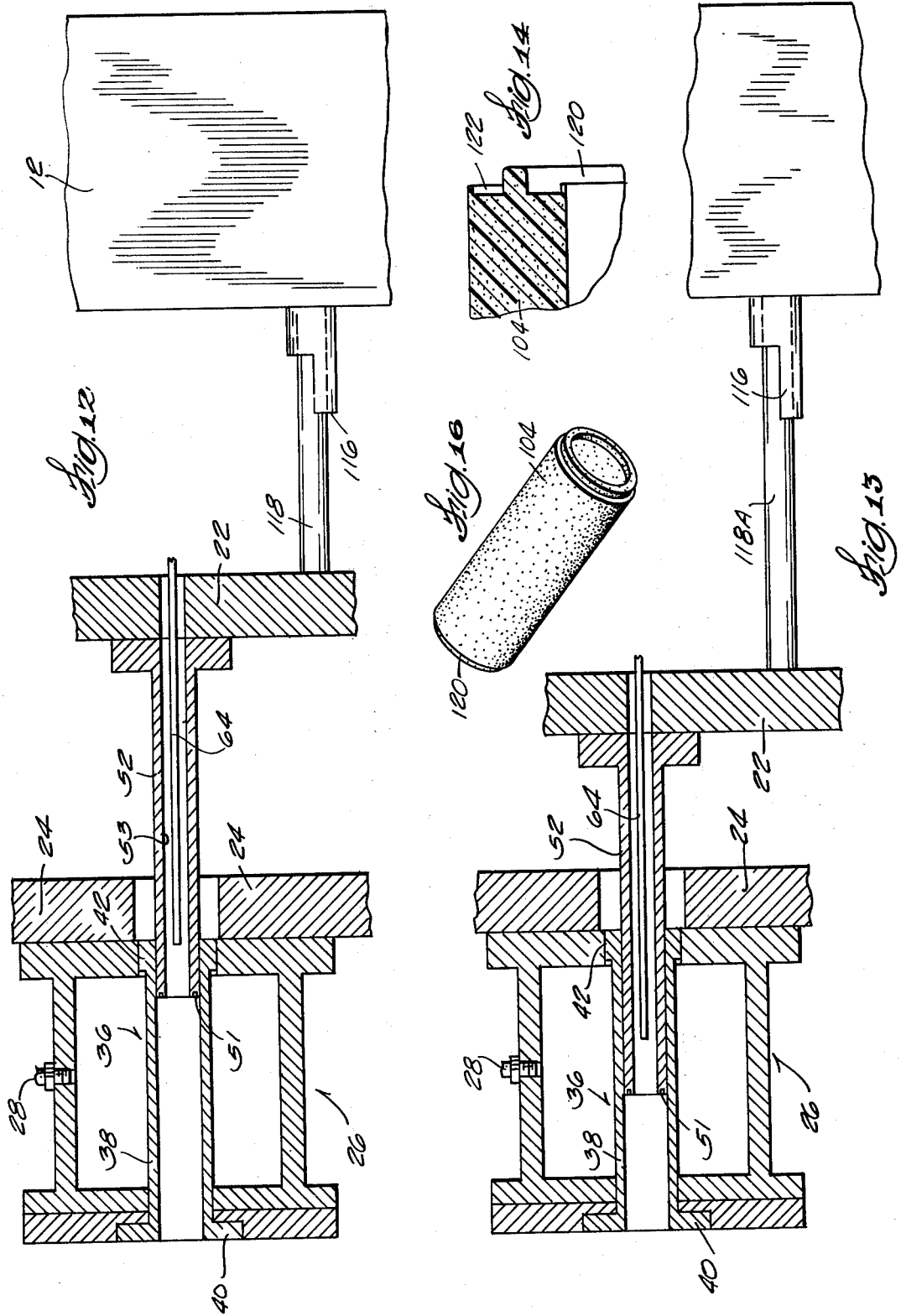

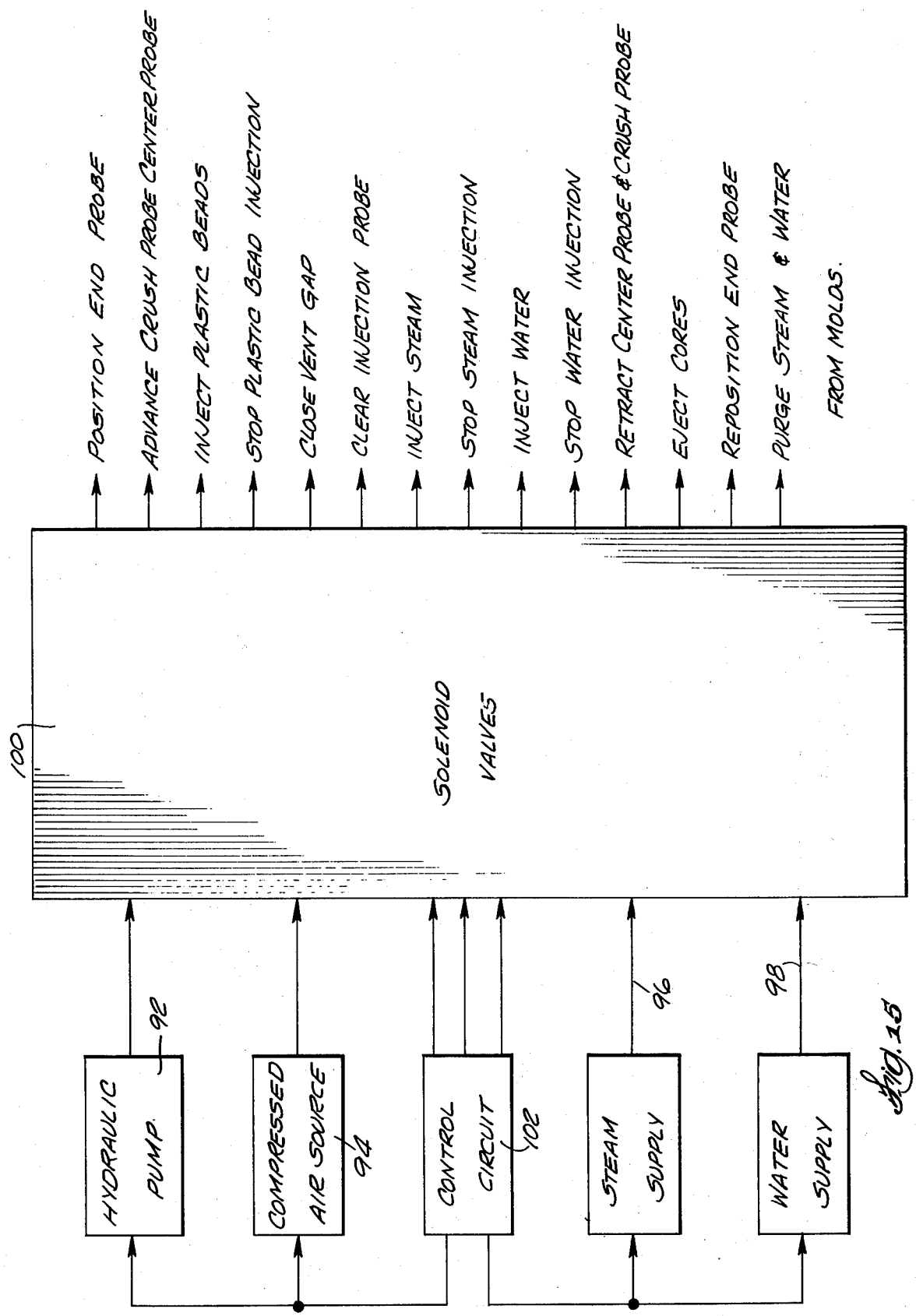

CORE MOLDING MACHINE

BACKGROUND OF THE INVENTION

In the past, wooden spools for thread have been replaced by molded plastic spools, which are significantly lower in cost. However, it has heretofore been necessary to continue to use paper or wooden cores for certain paper rolls, such as cash register tape rolls, since these rolls are wound on centerless drive rollers which require a completely smooth cylindrical exterior surface on the core without any flash line such as is normally left at the parting line of a conventional split mold for molded articles.

SUMMARY OF THE INVENTION

In accordance with this invention, cylindrical cores that have a completely smooth exterior surface without any imperfections such as core vents, steam holes or vents, parting lines or fill gun marks, are molded in a battery of molds which each include a female die which has a cylindrical cavity which is open on both ends, an end probe or plug that is slidable into and out of one end of the cavity and has a duct therein through which plastic material is injected into the cavity, and a center probe or plug that is slidable into and out of the other end of the cavity and has a duct therein through which steam is injected into the cavity to heat the plastic therein. The center plug abuts against the open end of the duct on the end plug in its innermost position and closes the duct after plastic beads have been injected into the mold cavity. Other features of the invention include a crush probe or plug that is slidable toward and away from the end of the cavity adjacent the center probe and closes that end of the cavity. A smaller vent gap is held open between the female die and the crush plug while plastic beads are being injected into the cavity to allow air to escape from the cavity. The vent gap is closed after the cavity has been filled with plastic beads. After steam has been applied to the center plug to fuse the plastic beads in the cavity, cool water is applied thereto to cool the molded article, which is subsequently ejected from the cavity by the end plug.

An important feature of this invention is the novel end plug that forms one end wall of the mold cavity and incorporates an injection duct through which plastic can be injected into the cavity, thereby eliminating the separate fill gun that was heretofore used in connection with such molds. The invention also provides means for adjusting the initial position of the end probe to control the length of the molded cores.

One end of the molded core is densified by being adjacent to the plastic injection duct and the other end is densified by being adjacent to the crush plug. This end densification strengthens the core in the locations where strength is needed.

An important feature of the present invention is characterized by me as dynamic filling. The mold is not completely closed when the plastic beads are injected into the mold cavity. The center probe continues to advance during filling and the crush probe remains open to vent air. The fill cycle is completed just as the center probe seats in the end of the injection duct of the end probe to block further fill and close that end of the mold cavity. The crush probe is then advanced to close the other end of the mold cavity and compact the plastic beads therein. Accordingly, mold parts are in motion during the fill cycle.

Other objects, features and advantages of the invention will appear from the disclosure hereof.

DESCRIPTION OF THE DRAWINGS

FIG. 1 is a side elevational view of a molding machine embodying the invention.

FIG. 2 is a fragmentary plan view of a portion of the machine shown in FIG. 1.

FIG. 3 is a fragmentary axial cross-sectional view through one of the molds in the molding machines of FIGS. 1 and 2, along with accessory parts therefor.

FIG. 4 is an axial sectional view through a mold showing the position of the mold parts at the beginning of an operating cycle therefor.

FIG. 5 is an axial sectional view of the mold parts with the crush plug moved to within a small vent gap of one end of the female die.

FIG. 6 is a similar view showing the relationship of the mold parts as plastic beads are injected into the cavity.

FIG. 7 is a similar view showing the relationship of the mold parts as the center probe seals off the plastic injection duct in the end probe.

FIG. 8 is a similar view showing the relationship of the parts when the crush plug is moved into the end of the female die to close the vent gap and densify the plastic beads adjacent to the crush plug.

FIG. 9 is a similar view showing both the crush probe and center probe in fully seated positions and during the purging of plastic beads from the injection duct in the end probe.

FIG. 10 is a similar view showing the relationship of parts in the mold when the molded core is being ejected from the die cavity by the end plug.

FIG. 11 is a fragmentary horizontal sectional view showing the adjustment mechanism for controlling the spacing between the crush plug and the female die for venting air from the mold cavity.

FIG. 12 is a fragmentary sectional view showing the mechanism for controlling the position of the end plug within the mold cavity to control the length of the molded core.

FIG. 13 is a view similar to FIG. 12 showing the end plug in a position to make a shorter core than shown in FIG. 12.

FIG. 14 is a detailed fragmentary axial sectional view of one corner of a molded core showing the annular rib which prevents flash on the end of the cores from interfering with the position of the cores when they are laid end to end.

FIG. 15 is a block diagram of the automatic control apparatus for the core molding machine.

FIG. 16 is a perspective view of a plastic core as fabricated on the apparatus of the present invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 is a side elevational view of one form of apparatus embodying the invention which includes a battery of forty molds which are arranged in four horizontally extending rows of ten molds each. This molding machine is mounted upon a frame including a base 10 and two stationary end platens 12 and 14 which are rigidly attached to base 10 and extend upwardly therefrom. Four slide rods 16 are rigidly connected between the corners of end platens 12 and 14. Two of the slide rods 16 are visible in FIG. 1 and it will be understood that the other two slide rods 16 are mounted on the other side of the machine which is not visible in FIG. 1.

Three vertically extending plates 18, 20 and 22 are slidably mounted by conventional bushings 19 on the slide rods 16. A fixed plate 24 is rigidly secured by anchors 21 on frame base 10 and extends upwardly therefrom parallel to the slidable plates 18, 20 and 22. Fixed plate 24 supports four horizontal rows of die chests 26, each of which contains a female die having a cylindrical cavity therein which is open at both ends. Hoses 28 are connected to die chests 26 to carry steam and water into each die chest to heat and cool the female dies therein as is described hereinafter. Movable plate 18 is moved back and forth along slide rod 16 by hydraulic motor 30. Movable plate 20 is moved back and forth along slide rod 16 by a hydraulic motor 32 (FIG. 2), and movable plate 22 is moved back and forth along slide rod 16 by another hydraulic motor 34.

FIG. 3 is an axial sectional view through one of the die chests 26 and shows the female die 36 therewithin and the other mold members that interact therewith. As is also shown in FIGS. 4–10, inclusive, female die 36 comprises a hollow cylindrical sleeve 38 which has a relatively large diameter flange 40 at one end and a smaller diameter flange 42 on the other end. Female die 36 has a cylindrical mold cavity 44 therewithin which is open at both ends. Each female die 36 is rigidly held within its die chest 26 by conventional means which includes O-rings 46 and 48 which seal the die walls to the die chest wall so as to prevent escape of steam or water, both of which are introduced into the mold during the molding operation.

A circular opening 50 is provided in plate 24 in axial alignment with the female die 36. A hollow cylindrical end probe or sleeve plug 52 which is coaxial with female die 36 is mounted upon movable plate 22 and is movable into and out of the molding cavity 44. In FIG. 3, the lefthand or free end 51 of end probe 52 is shown inserted a short distance into mold cavity 44 and forms a core end boundary surface thereof. The interior of end probe 52 is hollow and forms a duct 53 therein. An opening 54 is formed in plate 22 in alignment with duct 53. A manifold 56 is attached to plate 22 over all the openings 54 for one horizontal row of steam chests and contains an opening 58 to which a hose or conduit 60 is attached. When the mold cavity 44 is to be filled with plastic, expandable polystyrene beads or other suitable expandable plastic beads are forced from hopper 62 (FIG. 1) by air pressure of source 94 through conduit 60, openings 58 and 54 and duct 53 and thence into mold cavity 44. The expandable polystyrene beads are stored in a conventional bead hopper 62 (FIG. 1) and are blown down conduit 60 at the appropriate time.

A blow-back tube 64, which is much smaller in diameter than the inside diameter of end probe 52, is mounted on manifold 56 and extends within the interior of duct 53 in end plug 52 and terminates near the end thereof. An air conduit 66 is coupled to blow-back tube 64 via manifold chamber 67 and receives compressed air to blow the loose plastic beads out of the duct 53 before mold cavity 44 is heated, thus to prevent fusing of the polystyrene beads within end probe 52.

At the other end of molding cavity 44, a cylindrical center probe or plug 68 is mounted upon movable plate 18 and is movable into and out of the molding cavity 44 to the position where its tapered end 70 closes off the free end of duct 53 in end probe 52, as shown in FIG. 9. Center probe 68 is coaxial with female die 36 and provides the central core boundary surface for the cylindrical cores molded within mold cavity 44. Center probe 68 preferably contains slots 73 (FIG. 3) to introduce steam into mold cavity 44 to heat, expand and fuse the polystyrene beads and also for introducing cooling water into the cavity 44 to cool the molded cores.

The hollow interior of center probe 68 constitutes a duct 71 into which steam and water are selectively injected by steam-water feed tube 72 which communicates with a pair of manifolds 74, 76 mounted on movable plate 18. Steam and water are selectively introduced at the appropriate times into te hollow interior chamber 80 of manifold 76 via a conduit 78 and from there through tube 72 to the far end of center probe 68. The steam and water which discharge into the duct 71 in center probe 68 are drained out through the hollow interior cavity 82 of manifold 74.

Another end probe, herein denominated as a crush probe or plug 84, is mounted upon movable plate 20 and is telescopically related to the end probe 68. End probe 68 is freely movable through a central bore or opening 85 in crush probe 84. Crush probe 84 has an external annular stepped configuration, including a shoulder 83 (FIG. 3) which abuts the flange 40 on female die 36 in the position of the parts shown in FIGS. 8 and 9. The end 86 of crush probe 84 adjacent to the open end of molding cavity 44 in female die 36 is dimensioned to fit snugly within cavity 44 and form a core end boundary surface thereof.

On the opposite side of movable plate 20 from crush probe 84, a hollow center probe housing sleeve 88 is mounted. Sleeve housing 88 telescopically receives the portion of center probe 68 which contains the slots 73, thus to cover the slots when the center probe 68 is withdrawn from the female die 36, and before the center probe 68 is inserted into the female die 36. See FIGS. 4, 5, 10 and 11. An O-ring 90 seals the end of center probe housing 88 and prevents loss of steam or water through the end of housing 88 (FIG. 3).

As shown in FIG. 15, the molding machine also includes a hydraulic pump 92, compressed air source 94, a steam supply 96, a water supply 98, and suitable conventional conduits and valves including a battery of solenoid valves 100, for controlling these fluids in accordance with a predetermined cycle which is controlled by a conventional electrical control circuit 102. Control circuit 102 is adapted by conventional means to produce the sequence of steps listed on the righthand side of FIG. 15 in sequence from top to bottom. This sequence of operation will be described in connection with FIGS. 4–10 which illustrate the position of the various molding members at different steps during the molding cycle.

The first step of the molding cycle is to position plate 22 (as hereinafter described) to insert end probe 52 into female die 36 an appropriate distance to establish the desired core length. This is shown in FIG. 4. Plates 18 and 20 are then moved together toward the female die chests 26 until the gate end 86 of crush probe 84 is within a predetermined vent gap distance 103 from the adjacent end of female die 36 as shown in FIG. 5. At the same time, center probe 68 is moved partially into the mold cavity 44. The vent gap distance 103 established by the open gate 86 is maintained to allow air to escape from mold cavity 44 when the polystyrene beads are blown into the molding cavity through duct 53 in end probe 52. The step of pneumatically injecting the expandable plastic beads into mold cavity 44 from plastic bead hopper 62 is initiated by control circuit 102 when the mold parts are in the FIG. 5 position. FIG. 6 illustrates such pneumatic injection. The plastic beads are blown into cavity 44 and the air escapes through gate 86 and vent space 103, as indicated by the arrows in FIG. 6. This space is too small to pass the beads, which loosely fill cavity 44 under pressure of the air compressor source 94. As shown in FIG. 6, the center probe 68 continues to move into cavity 44 during the loose filling thereof. I characterize this as dynamic filling, inasmuch as mold parts are in motion during the fill cycle. The rate of injection of plastic beads is coordinated with the advance of the center probe 68 to avoid excessive resistance to probe movement, and to insure complete filling of the cavity at the point in the cycle when the free end 70 of center probe 68 first enters the duct 53 of end probe 52. This stops further injection of plastic beads into cavity 44 and is illustrated in FIG. 7.

The next step of the sequence is to move crush probe 84 toward the adjacent hollow end of female die 36 as shown in FIG. 8 to close the gate 86 and the vent gap 103 in cavity 44. In the course of this movement, the cylindrical end of probe 84 is telescopically received into cavity 44, until shoulder 83 on probe 84 bottoms on flange 40 of female die 36, as shown in FIG. 8. Inward movement of crush plug 84 densifies the plastic beads on the adjacent end of the molded core to strengthen the end. The opposite end of the molded core is densified by being adjacent to plastic injection duct 53.

Meanwhile, the center probe 68 continues to advance until its end 70 is seated into the end of the end probe duct 53, as shown in FIG. 8. In FIG. 8, both probes 84 and 68 are fully seated. The molding cavity 44 is now completely filled with expanded polystyrene beads and is completely closed and is ready to be heated, thus to expand and fuse the beads.

Before the heating is commenced, however, compressed air is introduced into blow-back tube 64 within the end probe 52 to blow all the loose plastic beads out of duct 53 in end probe 52 back up into the hopper 62 (FIG. 1). This step is illustrated in FIG. 9. Thus, duct 53 is purged of plastic beads which might otherwise fuse in duct 53 and interfere with subsequent cycles. Immediately thereafter, steam is introduced into the female die chests 26 and also into the steam and water injection tubes 72 (FIG. 3), so that both the interior and exterior of molding cavity 44 is heated to expand the polystyrene beads and fuse them together. After the steam injection is terminated, water is injected both in the female die chest 26 and through steam and water injection tube 72 to cool the molded core. Immediately thereafter, center probe 68 and crush probe 84 are withdrawn from the mold cavity 44 and the molded core 104 (FIG. 10) is ejected by moving end probe 52 through the mold cavity 44 to push the molded core 104 out of cavity 44. The molded cores 104 drop into a container or conveyor (not shown) below the machine. After the molded cores 104 are ejected, the various parts of the molds are returned to the starting position shown in FIGS. 3 and 4, the steam and water are purged from the interior of the molds, and a subsequent molding cycle is commenced.

FIG. 11 shows the preferred mechanism for controlling the size of vent gap 103 between the end of crush probe 84 and the adjacent end of female die 36. A threaded stud 106 is engaged in a threaded hole in the interior of movable plate 20 which supports the crush probes 84. Stud 106 has an end slot 108 so that it can be turned by a screw driver to adjust the length of the stud extending beyond plate 20. A lock nut 110 is provided to lock the stud 106 in the desired position. An abutment rod 112 extends through openings in plates 22 and 24 in alignment with stud 106 and abuts against the end of stud 106 to arrest the movement of plate 20 with the crush probes 84 spaced by the desired vent gap from the end of female die 36. In a practical embodiment of the invention, this spacing is typically set at .03 inches. Abutment rod 112 is coupled to a conventional hydraulic motor 114 on end platen 12 which holds abutment rod 112 in position against the push of the hydraulic motor 32 (FIG. 2) which moves plate 20. The force of hydraulic motor 32 is normally less than that of hydraulic motor 114, which thus stops the movement of plate 20 at a position determined by stud 106. This establishes the desired vent gap 103 between crush plug 84 and female die 36, which vent gap 103 can be accurately adjusted to any desired spacing by means of the threaded stud 106, and can be locked in the desired position by nut 110. The single stud 106, rod 112 and motor 114 illustrated in FIG. 11 is typical of several sets of these parts, for example, four such sets at spaced locations in the machine.

When it is desired to close the vent gap 103, the hydraulic pressure on hydraulic motors 112 is released. This eliminates the resistance of such motors 114 to the pressure of motor 32, which causes plate 20 to move to the right in FIG. 11 until the crush probe closes the vent gap 103.

FIGS. 12 and 13 show the mechanism through which the position of the end probe 52 within female die 36 can be controlled to vary the length of the molded core 104. Near its four corners, end platen 12 is provided with sockets 116 which replaceably receive core gauge spacer stop rods 118. Rods 118 hold plate 22 at a predetermined distance from end plate 12 to establish a corresponding position of the end probes 52 within female dies 36. The differing positions of end probe 52 to give the desired length of the molded cores 104 is determined by the length of spacer rods 118. FIG. 13 shows a spacer rod 118A which is longer than the spacer rod 118 in FIG. 12 and therefor produces a shorter core 104. It will be apparent that any desired length core 104 can be molded by providing the appropriate length for the spacer rods 118.

The inner end or face 86 of crush probe 84 and the inner end or face 51 of end probe 52 are each preferably provided with annular grooves to provide outwardly projecting annular ribs 120 (FIGS. 10, 14, 16) on both ends of the molded cores 104. Accordingly, the cores 104 can be accurately positioned end-to-end in a common winding machine without having their position influenced by flash. As shown in FIG. 14, annular rib 120 extends significantly further outwardly of the end of core 104 than the worst flash 122.

The annular rib 120 and the adjacent end of core 104 on the end adjacent to end plug 52 is densified by virtue of its proximity to the outlet of plastic injection duct 53 and the rib 120 and the other end of core 104 is densified by the inward movement of crush plug 84, thereby increasing the strength of both end portions of the molded cores 104.

The apparatus of the present invention produces tubular parts or cores with an external surface which is perfectly circular and smooth, free of any imperfections such as core vents, steam holes or slits, parting lines or fill gun marks and is draft-free in all dimensions. This advantageous result is achieved by incorporating the ducts for charging or filling the mold with plastic beads, admitting steam and water, etc., in the interior of the mold parts and eliminating the need for external apparatus or connections for these functions. These functions are effectuated by shifting the mold forming components.

In the preferred apparatus as hereinbefore disclosed, the mold comprises several components, one of which is stationary and the others of which are individually shiftable with respect to the stationary component. The shiftable components are positioned sequentially in relation to each other and to the stationary component to carry out the molding sequence hereinbefore described. The several mold components are coaxially related and the shiftable components move along said axis.

I claim:

1. Core molding apparatus comprising a female die having a mold cavity therein which has two open portions positioned opposite each other, an end probe movably mounted adjacent to one open portion and movable into and out of said cavity through said open portion, the portion of said end probe which enters said cavity comprising a core end boundary surface, said end probe having a duct therein which communicates into said cavity when said end probe is within said cavity, means operable to move said end probe into and out of said cavity, means operable to feed plastic material into said duct when said end probe is within said cavity to fill said cavity with plastic material, a center probe movably mounted adjacent to the other open portion of said cavity and movable into and out of said cavity through said other open portion far enough to abut against the innermost end of said end probe, the portion of said center probe which enters said cavity comprising a core boundary surface, the end of said center probe comprising a plug coacting with the open end of said duct in said end probe to thereby close said open end, and means operable to move said center probe into and out of said other open portion of said cavity.

2. Core molding apparatus of claim 1 in which said center probe has an internal duct and means operable to supply a heated fluid into said internal duct to heat the plastic material within said cavity.

3. Core molding apparatus of claim 2 in combination with means operable to supply a cool fluid into said internal duct to cool the plastic material in said cavity.

4. Core molding apparatus of claim 1 wherein said mold cavity is cylindrical in shape and is open on both ends, the cylindrical wall of said mold cavity being unbroken to provide an unbroken cylindrical surface on articles molded therein.

5. Core molding apparatus of claim 1 in combination with a stationary frame for said female die and means operable to move said end and center probes relative to the stationary female die.

6. Core molding apparatus of claim 1 in combination with a crush probe having a central opening through which said center probe is movable, and means operable to move said crush probe toward and away from said cavity, said crush probe having an end portion comprising a core boundary surface.

7. Core molding apparatus of claim 6 in combination with means for limiting the movement of said crush probe toward said cavity to provide a vent gap between said cavity and said crush probe through which air can escape from said cavity.

8. Core molding apparatus of claim 7 in further combination with means operable to overcome the resistance of said limiting means to close said vent gap.

9. Core molding apparatus of claim 7 wherein said means operable to move said crush probe toward and away from said cavity comprises a first motor coupled to said crush probe, abutment means positioned to limit the movement of said crush probe toward said cavity to form a vent gap of predetermined size, a second motor coupled to said abutment means and positioned to oppose movement of said crush probe toward said cavity, the force exerted by said first motor being normally too low to move said abutment means against the force of said second motor, and means operable to change the relative forces exerted by said motors whereby the first motor overcomes the opposition of said second motor to close said vent gap.

10. Core molding apparatus of claim 9 in which said abutment means comprises a threaded stud for adjusting the width of said vent gap.

11. Core molding apparatus of claim 1 in combination with adjustable means for limiting the movement of said end probe in said cavity to control the length of the core molded in said cavity.

12. Core molding apparatus of claim 11 wherein said means for adjustably limiting the movement of said end probe in said cavity comprises a plurality of spacers of different size and means to removably support said spacers in the path of movement of the means operable to move the end probe.

13. Core molding apparatus comprising a plurality of coaxially related mold components, means operable to cause relative movement of said components on said axis, said components comprising a female die having a core cavity and core boundary wall about said cavity, a center probe telescopically receivable in said cavity and having a core boundary wall coaxial with the core boundary wall of the female die, movable opposite end probes with end faces forming core boundary walls, one of said end probes having internal duct means connectable to means operable to feed plastic material to said cavity through said duct, the end of said center probe comprising a plug coacting with the open end of said duct in said one end probe to thereby close said open end, the other end probe comprising gate means to vent said cavity during the feeding of plastic material to the cavity through said internal duct.

14. Core molding apparatus of claim 13 in combination with means operable to vary the axial distance between said end probes to vary the length of cores fabricated on said apparatus.

15. Core molding apparatus of claim 13 in which said end probes are telescopically receivable within said female die, and means operable to force said gate end probe telescopically into said female die after it is filled with plastic material to crush said material.

16. Core molding apparatus of claim 13 in which the gate end probe has a hollow bore through which the center probe is advanced axially into said cavity, said center probe having an end portion which enters the duct of the said one end probe to seal said duct after the cavity is filled with plastic material.

17. Core molding apparatus of claim 13 in which said center probe has a hollow internal duct, in combination with means operable to selectively charge said hollow internal duct with hot and cold fluids.

18. Core molding apparatus of claim 13 in combination with means operable to purge the internal duct of said one end probe of plastic material after said cavity has been filled.

19. Core molding apparatus of claim 13 in combination with means operable to fill said core cavity with plastic material through said internal duct of the end probe while advancing the center probe into said cavity for dynamic filling of the mold.

* * * * *